Sept. 3, 1940.  F. H. MARKWICK  2,213,767

GAUGE

Filed March 31, 1939

Inventor
Frederick H. Markwick

By Maréchal & Noé
Attorney

Patented Sept. 3, 1940

2,213,767

UNITED STATES PATENT OFFICE 2,213,767

GAUGE

Frederick H. Markwick, Dayton, Ohio, assignor to The Sheffield Gage Corporation, Dayton, Ohio, a corporation of Ohio Application March 31, 1939, Serial No. 265,119

5 Claims. (Cl. 33—178)

This invention relates to tool members and more particularly to tools, such as gauges or other parts that in service repeatedly interengage other members.

The principal object of the invention is the provision of a tool member of the character mentioned incorporating an applied coating of a brittle metal of high wear resistant qualities, the coating terminating some distance from an end of the tool member in flush and abutting relation with an offset or border portion of the main body part to which the coating is applied, so that the coating is protected from impacts and prevented from stripping or flaking.

Other objects and advantages of the invention will be apparent from the following description and the appended claims, taken in connection with the accompanying drawing.

In the drawing, in which the invention has been illustrated in its preferred form as applied to a tool member such as a plug gauge:

Figure 1:
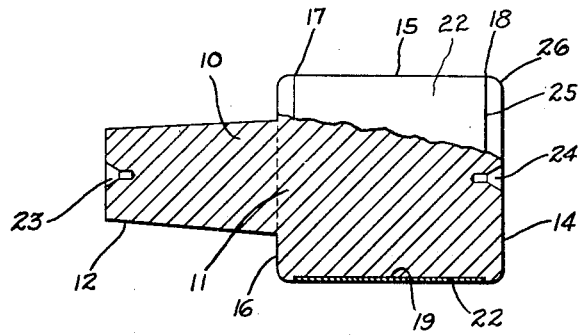
Fig. 1 is a side elevation, partly in section, of a gauge embodying the present invention.

The application of a hard metal coating of a brittle character to the wear surfaces of tool members such as plug gauges, ring gauges, gauge plates, die punches, and the like has been resorted to to afford a longer life to the tool member in resisting wear of those parts that are repeatedly interengaged with other members during service. An electrodeposited chromium plating or coating on a body part of steel or other suitable tough metal is of value in greatly increasing the life of the tool member while maintaining the accurately finished surface to a close limit of accuracy. However, in plug gauges, the brittle coating has extended the full length of the outer gauging surface and in ring gauges has extended the full length of the inside gauging surface. In flat plates the coating has extended the full length of the gauge surface. Thus the end of the coating in such tool members is exposed to impacts and they must be carefully handled so as not to strike and chip or flake off the exposed end of the coating. If the chromium surfaced tool is a punch, such chipping or flaking will render the punch useless for proper engagement with the die, and in the case of a gauge the chipping or flaking of the brittle surfacing coat will not only render the gauge inaccurate but may damage the work piece by scratching or scoring. The present invention provides a construction in which the terminal end of the coating is protected so that the repeated blows to which the end of the tool member is subjected are assumed by the tough metal forming the body part of the tool member, with the coating terminating a short distance from the end of the tool member in flush and abutting relation with an offset portion of the main body part having the same dimension as the accurately finished surface of the coating.

It is believed that the full field of usefulness of the invention will be clearly apparent from a consideration of an embodiment as applied to a plug gauge 10 which may be of circular or other cross sectional form in accordance with requirements. The plug gauge comprises a steel body part 11, one end of which has a tapering extension 12 which may be held in a suitable handle, the other end 14 forming the entering end and providing an end face which extends substantially transversely of the gauging surface 15.

The steel body portion 11 adjacent its opposite ends 14 and 16 and more particularly at the locations 17 and 18 is finished to the exact size of the gauging surface 15. However between the locations 17 and 18 the outer or side wall 19 of the body part 11 is slightly offset, being of slightly smaller size in the case of a plug gauge, and has on it an applied layer or coating 22 of hard and brittle surfacing material having a high resistance to wear and integrally united therewith. This coating is preferably an electrodeposited chromium thin layer of the order of about .003 inch in thickness, Fig. 1 of the drawing showing the thickness of the coating quite exaggerated. When the chromium is first applied to the body member in a plating bath by the use of a suitable cylindrical anode standing concentrically with respect to the plug axis, its thickness is somewhat in excess of the desired amount, the excess material being removed by a suitable lapping operation which accurately finishes the gauging surface 15 to the desired size. The portions 17 and 18 of the body part are preferably accurately finished at the same time. In this lapping operation the same centering holes 23 and 24 which were used in forming or grinding the main body part 11 are utilized.

After the hard surface or coating 22 is applied and ground or lapped to the desired size, the terminal end 25 of the coating ends some little distance from the end face 14 and stands in abutting relation with the portion 18 of the steel body part, with the outer surface of the coating flush with the outer surface of the portion 18. Preferably the outer surface of the end portion of the body part is of the same diameter or external dimension as the surface 22 for about 1/32 of an inch or so towards the entering end face 14, the entering end of the steel body part 11 being chamfered or rounded as indicated at 26 to facilitate engagement of the plug with a part to be gauged. The opposite ends of the gauging surface may be of similar construction so that both terminal ends of the hard surface coating are protected and shielded against those blows or impacts to which the ends, and especially the entering end, of a gauge are subjected as the gauge is applied to the parts to be gauged. In accordance with the present invention those impacts or blows to which the entering end of the gauge are subjected in a gauging operation are applied to the tough steel body part itself, and the terminal end of the brittle coating is thus prevented from flaking or chipping off since the coating is subjected merely to a sliding friction. Great care need not be employed by the user in applying the end of the gauge to the work pieces to be measured, since the steel end portion of the gauge is capable of assuming the repeated blows applied in gauging operations without chipping or flaking off. Although some wear may occur on the exposed portions of the body part near the end of the chromium coating, the chromium coating itself is capable of resisting the sliding friction to which it is subjected in repeated gauging operations and provides a gauging surface having a very long and useful life.

Figure 2:
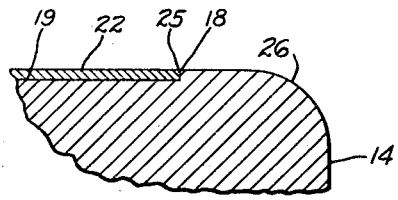
Fig. 2 is an enlarged fragmentary section of an end portion of the gauge and illustrating a portion of the outside gauging surface of a plug gauge or the inside gauging surface of a ring gauge.
Figure 3:
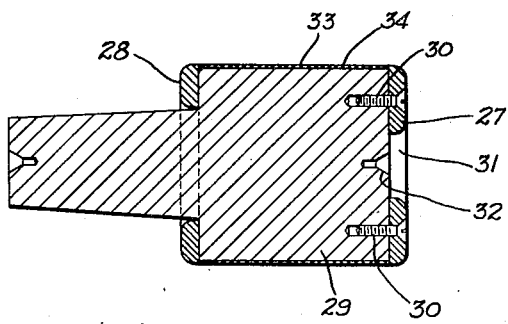
Fig. 3 is a sectional view of a gauge having a body portion of slightly modified form.

In accordance with the gauge shown in Figs. 1 and 2, the end portions of the body part and the central portions to which the coating is applied are made from a single piece of metal. However as shown in Fig. 3, the end portions 27 and 28 of the body part may be formed separately from the central portion 29 and secured to the central portion by brazing. Attaching screws 30 may also be used. The end portion 27 of steel or other suitable metal has a central hole 31 so that it will not cover the centering hole 32 of the central portion 29, and the centering hole 32 may therefore be used in finishing the gauging surface 33. The electrodeposited chromium coating 34 extends between and is flush with the end portions 27 and 28 and is preferably applied to the body portion of the gauge after the end portions 27 and 28 are secured to the part 29.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A tool member of the character described adapted for axial movement into engagement with other members, said tool member comprising a body part of a tough metal, having a side wall and an entering end face extending substantially transversely of the side wall, and an applied thin coating of a brittle metal covering the side wall as an accurately finished face and terminating a short distance back from the entering end face and in axially abutting relation with an end portion of the body part, said end portion of the body part at the line of junction with the coating having the same dimension measured transversely of the axis of the tool member as the accurately finished face of the coating.

2. A tool member of the character described having an accurately finished side surface and having an end portion which is repeatedly impacted in the normal operation of the tool member, comprising a body part of tough metal having a side wall which throughout its major extent is slightly offset with respect to a bordering portion of said body part, and an applied thin coating of a brittle metal covering the side wall and providing an accurately finished side surface and terminating a short distance back from the said end portion of the body part in abutting relation with the said bordering portion, said bordering portion through a short distance from its line of junction with said coating providing an accurately finished flush side surface in continuation of said coating and protecting the coating from the force of impacts applied to said end portion to prevent stripping of the said coating.

3. A gauging device of the character described adapted for engagement with members to be gauged to accurately determine a size relationship, said gauging device comprising a body part having a side wall and having an end portion slightly offset from the side wall and providing an entering end face extending substantially transversely of the side wall, and an applied coating of a brittle metal covering the side wall as a gauging side face and terminating a short distance back from the entering end face and in abutting relation with the offset end portion of the body part, said end portion at the line of junction with the coating having the same dimension as the gauging side face.

4. A gauging device of the character described adapted for axial movement into engagement with members to be gauged to accurately determine a size relationship, said gauging device comprising an axially extending steel body part having a side wall and an entering end face extending substantially transversely of the side wall, and a chromium plating of the order of a few thousandths of an inch in thickness applied to the side wall of the body part as a side gauging face and terminating a short distance back from the entering end face and in abutting relation and flush with an end portion of the body part, said end portion at the line of junction with the chromium plating and for a small distance towards the end face beyond the line of junction having the same dimension transversely of the axial direction of the gauging device as the exposed side gauging surface of the chromium plating.

5. A gauging device of the character described adapted for axial movement into engagement with members to be gauged to accurately determine a size relationship, said device comprising an axially extending body part of a tough metal having a side wall provided with an applied coating of a brittle metal which forms an accurately finished side gauging surface and also comprising a removable end member connected to said body part and providing an entering end face extending substantially transversely of the side gauging surface, said end member projecting laterally beyond said body part to provide a peripheral portion arranged flush with said applied coating on the body part.

FREDERICK H. MARKWICK.